Figure 1:
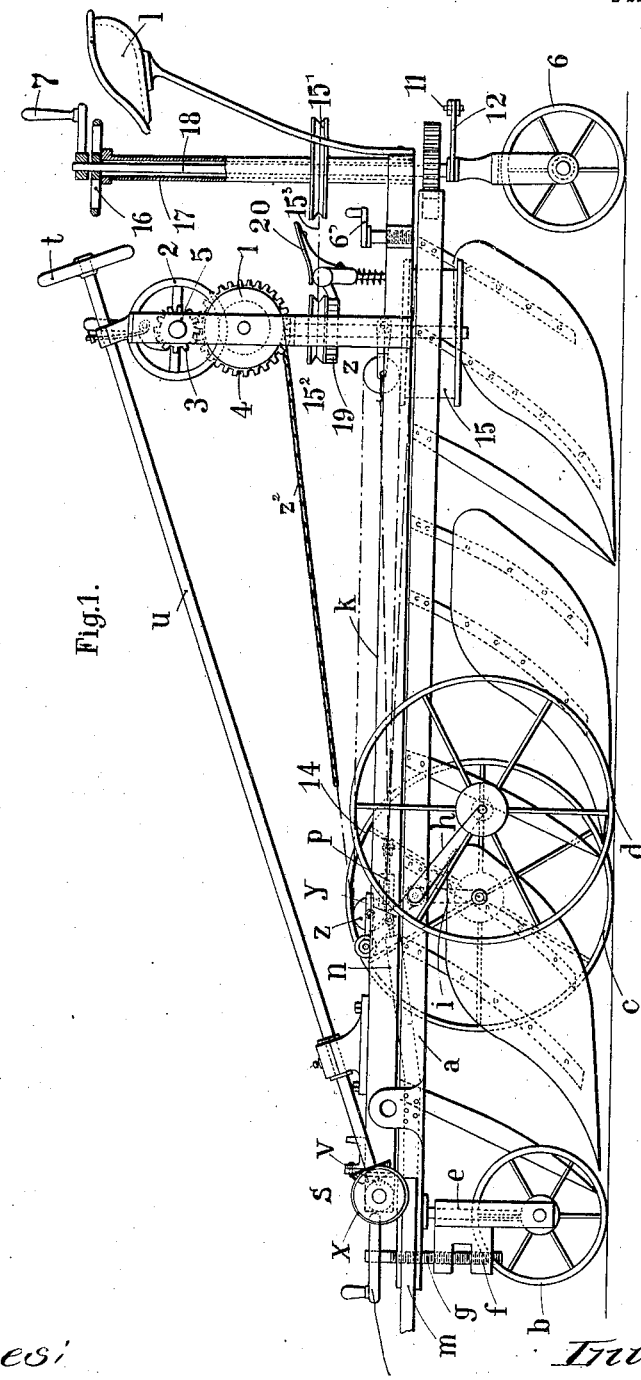

No. 790,721. PATENTED MAY 23, 1905.
A. CASTELIN.
PLOW.
APPLICATION FILED JULY 16, 1904.

2 SHEETS—SHEET 1.

Witnesses:

Inventor
André Castelin
By James L. Norris.
Atty.

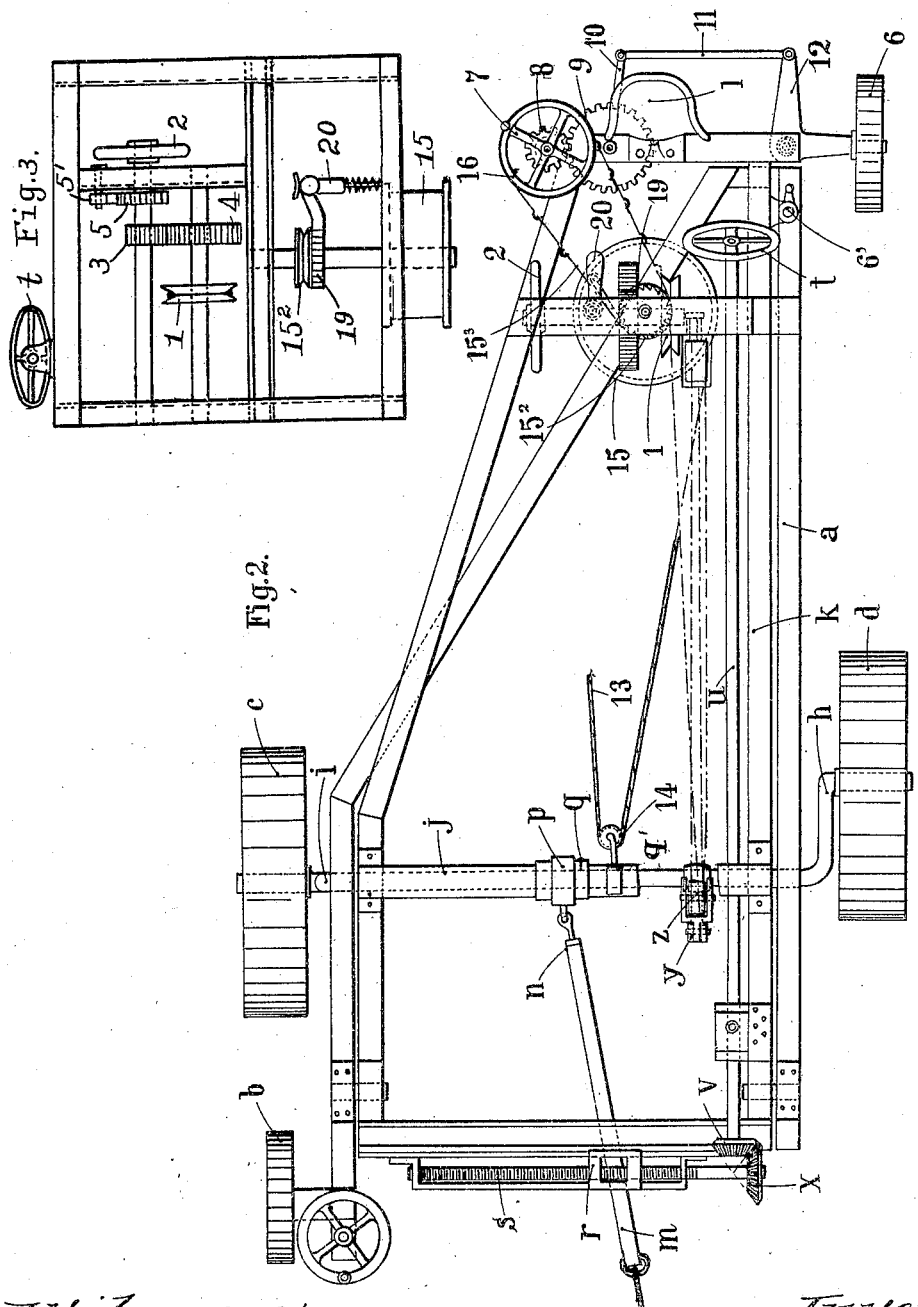

No. 790,721. Patented May 23, 1905.

UNITED STATES PATENT OFFICE.

ANDRÉ CASTELIN, OF PARIS, FRANCE, ASSIGNOR TO LA SOCIÉTÉ ANONYME D'ETUDES ET D'EXPLOITATION DES BREVETS A. CASTELIN POUR MACHINES AGRICOLES AUTOMOBILES, OF PUTEAUX, FRANCE.

PLOW.

SPECIFICATION forming part of Letters Patent No. 790,721, dated May 23, 1905.

Application filed July 16, 1904. Serial No. 216,886.

*To all whom it may concern:*

Be it known that I, ANDRÉ CASTELIN, engineer, a citizen of the French Republic, residing at Paris, France, have invented certain new and useful Improvements in Plows, of which the following is a specification.

This invention relates to plows of that class which are adapted to traverse a field through the medium of a tractor anchored at one side of the field, a pulley fixed at the other side of the field, and cables connected with the plow and with the tractor and passing over the pulley, one of the cables being connected to the front of the plow and with the tractor and the other of the cables being connected with the rear of the plow and with the tractor. The tractor is provided with a plurality of drums to receive the cables. As the plow is drawn toward the tractor by the cable attached to the front part of the plow and winding on one of the drums of the tractor a series of parallel furrows is made in the field; but during this movement the other cable which is attached to the plow is unwound from the other drum on the tractor and passes over the pulley heretofore referred to. On the return journey of the plow—that is, when the plow moves away from the tractor—the front part of the plow becomes the trailing part and the cable which connects the front part of the plow to the tractor is unwound from its drum, while the cable connecting the rear of the plow to the tractor through the medium of the aforesaid pulley is wound upon the other drum on the tractor.

In the drawings forming a part of this specification is illustrated a plow provided with three shares and which plows only as it moves toward the tractor and then returns; but it will be evident the number of shares can be increased or diminished and the shares so arranged that they will furrow the field when the plow moves to and from the tractor.

In describing the invention in detail reference is had to the accompanying drawings, wherein like reference characters denote corresponding parts throughout the several views, and in which—

Figure 1 is a side elevation of a plow constructed in accordance with this invention. Fig. 2 is a plan view thereof. Fig. 3 is an elevation of a detail.

Referring to the drawings by reference characters, $a$ denotes the frame of the plow, which is substantially trapezoidal in contour and is preferably supported by three wheels, (indicated by the reference characters $b\ c\ d$,) $b$ denoting the front wheel and $c$ and $d$ the side wheels. The forward end of the frame $a$ is vertically adjustable through the medium of mounting the wheel $b$ in a fork $e$, the latter being provided with a nut $f$, which is capable of a vertical movement upon an adjusting-screw $g$. It will be evident that when the screw $g$ is rotated through the medium of the hand-wheel $g'$ the fork $e$ will be adjusted, carrying the wheel $b$ therewith. The two side wheels $c\ d$ are mounted upon the cranks $h\ i$, connected to the ends of the transverse shaft $j$, journaled in the frame $a$ of the plow, the wheel $c$ being mounted upon the crank $i$ and the wheel $d$ upon the crank $h$. The two cranks $h\ i$ are of different throws and are not in the same plane, so that by turning the shaft $j$ the points of contact of the wheels $c\ d$ with the ground can be brought to the same level when the plow is running on level ground or to different levels when one of the wheels is traveling on the ground and the other of the wheels is traveling in a furrow.

The arrangements for operating are such that the operator can direct and operate the plow without leaving his seat. The operator can adjust as required the point of attachment of the cable to the front of the plow, so as to obtain the required movement of the plow relatively to the tractor in plowing a series of parallel furrows without having to shift the tractor; adjust the shaft carrying the side wheels so the said wheels can be brought to the desired position—for example, one of the wheels traveling in the furrow and the other on the surface of the ground when the plow is moving toward the tractor and is plowing and so that on the return journeys both wheels travel on the surface of the ground; also, during the plowing regulate the penetration of the shares into the ground and disengage the front plowshare while allowing the rear ones to plow; also, steer the plow on its return journeys and act on the traction-cables so as to stop the traversing of the plow while the motor on the tractor remains in motion or shift the plow when the said motor is stopped. Means are also provided to automatically detach the traction-cable when the tractive effort is so excessive as to cause danger of breakage.

Above the aforesaid plow-frame $a$ is a second frame $k$, which is jointed to the first frame $a$ at its fore part and carries at its rear the seat $l$ for the driver.

The cable $a'$ for coupling the fore part of the plow with the tractor (not shown) is connected with a ring or hook $a^2$, carried on one end of a rod $m$. The other end, $n$, of the rod $m$ is jointed to a sleeve $p$, fixed in the required adjusted position through the medium of a set-screw $q$ to a cross-stay $q'$ of the upper frame $k$. The rod $m$ extends through an eye carried by a nut $r$ and which is guided in such a manner as to be shifted without revolving along a transverse screw $s$, mounted on the front part of the upper frame $k$. The said screw $s$ is rotated by the driver from his seat by means of a hand-wheel $t$ on an inclined rod $u$, carrying a bevel-wheel $v$, gearing with another bevel-wheel $x$, carried by the spindle of the said screw $s$, so that on operating the hand-wheel $t$ the nut $r$ is shifted and with it the ring $a^2$, by means of which the cable is connected with the front part of the plow.

For adjusting the side wheels $c$ and $d$ the transverse shaft $j$, to which the cranks $h$ $i$, carrying the wheels $c$ $d$, are fixed, is provided with a lever-arm $y$, to the end of which is attached one of the pulleys $z$ of a double movable pulley-tackle, the other of the pulleys $z$ being secured to the rear of the frame $k$, as shown. The free end of the tackle-rope $z^2$ is wound on a drum 1 at the rear of the said frame $k$. The drum 1 is rotated by the operator from his seat by means of a hand-wheel 2 and toothed wheels 3 4. A ratchet-wheel 5 and pawl 5′ prevents the shaft $j$ turning by itself in a direction opposite to that which corresponds to the raising of the plowshares from the ground.

By altering the position of the side wheels $c$ $d$ the angle between the frame $a$ of the plow and the upper frame $k$ is changed, for the plow proper rests on the front wheel $b$ and side wheels $c$ $d$, while the upper frame $k$ is supported by the front wheel $b$ and by a wheel 6 at the rear of the plow. When the points of contact of the two side wheels $c$ $d$ with the ground are on the same level, the two frames $a$ $k$ are superposed. When the position of the side wheels $c$ $d$ is (in order to force the shares into the ground) so altered that the points of contact of the wheels with the ground are not on the same level, (one of the said side wheels running in a furrow and the other on the surface of the ground,) the first or under frame $a$ is lowered toward the rear, while the second or upper frame $k$ still rests on the front and rear wheels $b$ and 6. The shares are forced more or less into the ground by modifying the position of the side wheels $c$ and $d$.

In order when plowing to prevent the first or lower frame $a$ from being lifted by the reaction of the ground, a fulcrum may be formed on the upper frame $k$ by means of a screw 6′, carried by the frame $k$. The adjustment of the screw 6′ in a vertical direction determines the amount of penetration of the shares into the ground, the pressure exerted by the said screw 6′ at the rear by the second or upper frame $k$ on the first or under frame $a$ producing the same effect as a plowman produces when he bears on the handles of an ordinary plow. As the greater part of the weight is thrown back on the rear of the frame $k$ when the said frame bears on the first or under frame $a$ through the medium of the said screw 6′ when the wheels are so operated as to disengage the shares without altering the position of the screw, the front wheel $b$ is raised, while the rear wheel 6 still rests on the ground. The leading share is thus raised from the ground, while the other shares remain in the ground. During the return journey when the plow moves away from the tractor and when no plowing is done the plow runs on its side wheels $c$ $d$ and on the rear wheel 6, while the front wheel $b$ remains raised. The operator steers the plow by means of a handle 7 on a lever on a vertical shaft, which by means of reducing-gear consisting of gear-wheels 8 9 and rods and levers 10 11 12 alters the direction in which the rear wheel 6 runs. While the plow performs its return journey without plowing, the cable $a'$, connecting the front of the plow to the first drum of the tractor, is unwound, the drum on the tractor being disconnected from the driving-gear while the other cable 13 pulls the plow. At the end of the journey generally the motor of the tractor stops before the required point is reached, or when the latter point is reached the motor still goes on running. The operator must therefore be able from his seat in the first case to continue the winding of the cable and in the second case to allow it to go on unwinding. To this effect the cable passes over a pulley 14, attached to the cross-stay of the plow, and then is wound on a vertical drum 15, to which it is attached. The rotation of this drum 15 is controlled by a hand-wheel 16, mounted on a sleeve 17, surrounding the vertical steering-shaft 18, and motion is imparted to the drum by means of pinions 15' 15² and chains 15³. A pawl mechanism 19 prevents the unwinding of the cable from the drum. A treadle-lever 20 is provided to release the pawl when it is desired that the cable 13 shall unwind freely.

A tractor is not shown. Any form of tractor can be employed; but preferably the form of tractor employed is that as set forth in my copending application, Serial No. 177,625, filed October 19, 1903.

Having thus described and ascertained the nature of my invention and in what manner the same may be performed, I declare that what I claim is—

1. A plow embodying a share-carrying frame, a frame superposed upon and jointed to said share-carrying frame, an adjustable screw carried at the rear of said upper frame and bearing upon said lower frame, a vertically-adjustable front supporting-wheel depending from said upper frame, a steering-wheel depending from the upper frame at the rear thereof, an adjustable crank-shaft journaled in the lower frame, a pair of side wheels mounted upon the cranks of said shaft, a traction-cable for the forward end of the plow, an adjustable coupling for connecting said traction-cable to the lower frame, a traction-cable for the rear end of the plow, means carried by the upper frame for adjusting said coupling, thereby varying the point of attachment for the traction-cable at the front of the plow, means carried by the upper frame for adjusting the crank-shaft, means carried by the upper frame for operating the steering-wheel, means carried by the upper frame for winding and unwinding upon the plow the traction-cable for the rear end thereof, and means carried by the upper frame for adjusting said screw thereby regulating the penetration of the shares attached to the share-carrying frame.

2. A plow embodying a share-carrying frame, a frame superposed upon and jointed to said share-carrying frame, an adjustable screw carried at the rear of said upper frame and bearing upon said lower frame, a vertically-adjustable front supporting-wheel depending from said upper frame, a steering-wheel depending from the upper frame at the rear thereof, an adjustable crank-shaft journaled in the lower frame, a pair of side wheels mounted upon the cranks of said shaft, a traction-cable for the forward end of the plow, an adjustable coupling for connecting said traction-cable to the lower frame, a traction-cable for the rear end of the plow, means carried by the plow for adjusting said coupling, thereby varying the point of attachment for the traction-cable at the front of the plow, means carried by the plow for adjusting the crank-shaft, means carried by the plow for operating the steering-wheel, means carried by the plow for winding and unwinding upon the plow the traction-cable for the rear end thereof, and means carried by the plow for adjusting said screw, thereby regulating the penetration of the shares attached to the share-carrying frame.

3. A plow embodying an upper and a lower frame, a traction-cable for the forward end of the plow, a coupling for connecting the cable to the plow, a transverse screw secured to the forward part of the upper frame, a nut traveling upon said screw and engaging said coupling for adjusting it, causing thereby the varying of the point of attachment for the cable to the forward part of the plow, a beveled wheel carried by said screw, a rod supported upon the upper frame, a hand-wheel for rotating said rod, and a beveled wheel carried by the rod and engaging the beveled wheel on the screw and adapted when the rod is operated to rotate the screw, causing thereby the travel of the nut.

4. A plow embodying an upper and a lower frame, an adjustable shaft journaled in said lower frame and having a crank at each end, a side wheel mounted on each of said cranks, a lever-arm connected to said shaft, a drum, a pulley attached to said lever-arm, a pulley attached to the rear of the frame, a tackle-rope passing over said pulleys and winding upon said drum, and means for rotating the drum, causing thereby the adjustment of the shaft.

5. A plow embodying the combination with a traction-cable for the rear end thereof, of means for winding and unwinding the cable upon the plow, said means consisting of a drum, a chain and pinions for rotating said drum, a hand-wheel for controlling the operation of the chain and pinions, a pawl mechanism for preventing the unwinding of the cable off the drum, and a treadle-lever for releasing the pawl mechanism.

6. A plow embodying the combination with a share-carrying frame and a frame superposed upon and jointed to the said share-carrying frame, of means for regulating the penetration of the shares into the ground, said means consisting of a vertically-adjustable screw carried by the upper frame at the rear thereof and bearing on the lower frame at the rear thereof.

7. A plow embodying a lower frame carrying shares, an upper frame, a steering-wheel, a front supporting-wheel, a pair of side supporting-wheels, a traction-cable for the rear end of the plow, a traction-cable for the front end of the plow, means for automatically releasing the traction-cable from the front of the plow, means for winding and unwinding the traction-cable at the rear end of the plow, means carried by the plow for adjusting the side wheels, and means carried by the plow for operating the steering-wheel.

8. A plow embodying an upper and a lower frame, shares carried by the lower frame, means for connecting the forward end of the upper frame to the forward end of the lower frame, and means carried by the rear end of the upper frame and bearing against the rear end of the lower frame for regulating the penetration of the shares.

In testimony whereof I have hereunto set my hand in presence of two subscribing witnesses.

ANDRÉ CASTELIN.

Witnesses:
    HANSON C. COXE,
    PAUL BLUM.